US006981796B2

(12) United States Patent
Hsieh

(10) Patent No.: US 6,981,796 B2
(45) Date of Patent: Jan. 3, 2006

(54) ELECTRONIC THERMOMETER

(75) Inventor: Chih-Wei Hsieh, Chi Pei (TW)

(73) Assignee: Actherm Inc., Hsinchu Hsien (TW)

( * ) Notice: Subject to any disclaimer, the term of this patent is extended or adjusted under 35 U.S.C. 154(b) by 0 days.

(21) Appl. No.: 10/309,028

(22) Filed: Dec. 4, 2002

(65) Prior Publication Data

US 2004/0109491 A1 Jun. 10, 2004

(51) Int. Cl.
*G01K 1/14* (2006.01)
*G01K 7/00* (2006.01)

(52) U.S. Cl. ....................... 374/163; 374/208; 600/474

(58) Field of Classification Search ................ 374/208, 374/163, 170; 600/484, 474
See application file for complete search history.

(56) References Cited

U.S. PATENT DOCUMENTS

| | | | | |
|---|---|---|---|---|
| 4,688,949 A * | 8/1987 | Hatakenaka | 374/183 |
| 4,743,121 A * | 5/1988 | Takagi et al. | 374/163 |
| 4,813,790 A * | 3/1989 | Frankel et al. | 374/208 |
| D309,271 S * | 7/1990 | Kida | D10/50 |
| 5,013,161 A * | 5/1991 | Zaragoza et al. | 374/208 |
| 5,018,875 A * | 5/1991 | Cook | 374/208 |
| 5,165,798 A * | 11/1992 | Watanabe | 374/208 |
| D338,163 S * | 8/1993 | Atsumi et al. | D10/57 |
| 5,259,389 A * | 11/1993 | Muramoto et al. | 600/546 |
| 5,575,563 A * | 11/1996 | Chiu et al. | 374/141 |
| D379,936 S * | 6/1997 | Wei-Hsin | D10/57 |
| D420,604 S * | 2/2000 | Katzman et al. | D10/57 |
| 6,074,090 A * | 6/2000 | Chen | 374/183 |
| 6,394,648 B1 * | 5/2002 | Tseng | 374/208 |
| 6,406,182 B1 * | 6/2002 | Chen | 374/208 |
| 6,637,935 B2 * | 10/2003 | Chen | 374/185 |
| 2002/0163955 A1 * | 11/2002 | Yu | 374/208 |

* cited by examiner

*Primary Examiner*—Gail Verbitsky
(74) *Attorney, Agent, or Firm*—Leong C. Lei

(57) ABSTRACT

An electronic thermometer is constructed to include a casing, an electronic thermometer module mounted in the casing, a metal probe electrically connected to the electronic thermometer module for sensing the body temperature, a flexible covering is covered on the casing, the flexible covering having a tapered front portion protruded over the front side of the casing to a distance, and a hard stem connecting the metal probe to the distal end of the tapered front portion of the flexible covering.

6 Claims, 9 Drawing Sheets

ELECTRONIC THERMOMETER

BACKGROUND OF THE INVENTION

1. Field of the Invention

The present invention relates to electronic thermometers and, more particularly, to such an electronic thermometer that is durable in use.

2. Description of the Related Art

Conventional electronic thermometers commonly have a hard casing formed from plastics and a metal probe at the tapered front end of the hard casing. Because the tapered front end of a conventional electronic thermometer is not flexible, the user must use the thermometer carefully, preventing a break in the connection area between the casing and the metal probe. In order to eliminate this problem, electronic thermometers having a flexible body portion are developed. However these electronic thermometers are still not satisfactory in function. FIGS. 1 and 2 show an electronic thermometer constructed according to Taiwan Patent Publication No. 495024. This design of electronic thermometer comprises a casing 40, a tapered tube 42 formed of hard plastics and extended from one end of the casing 40, a flexible covering 41 formed from flexible material, for example, rubber and covered on the periphery of the tapered tube 42, a metal probe 43 provided at the front end of the tapered tube 42. The casing 40 has an opening 44 for viewing the liquid crystal display 45 of the circuit board inside the casing 40. This design of electronic thermometer has drawbacks. When the front end of the electronic thermometer curved during a measuring action, the connection area 46 between the covering 41 and the metal probe 43 tends to break (see FIG. 3). Another drawback of this design of electronic thermometer is that the coarse outer surface of the covering 41 tends to be covered with dirt. It is also difficult to remove dust from the coarse outer surface of the covering 41. Further, because the casing 40 has a smooth outer surface, the electronic thermometer may slip from the user's hand easily. FIG. 4 shows an electronic clinical thermometer according to U.S. Pat. No. 5,165,798. This design of electronic clinical thermometer has a soft flexible portion 51 forwardly extended from the body 50 and terminating in a metal probe 52. This design of electronic clinical thermometer has similar drawbacks as that of the aforesaid Taiwan Patent Publication No. 495024. FIG. 5 shows an electronic thermometer constructed according to U.S. Pat. No. 6,379,039. This design of electronic thermometer comprises a rigid casing 60, a distal end portion 61 provided at the front side of the rigid casing 60, a flexible probe stem 62 provided at the front side of the distal end portion 61 to hold a metal probe (not shown). This design of electronic thermometer still has numerous drawbacks. One drawback of this design of electronic thermometer is that the distal end portion 61 tends to be covered with dirt. Another drawback of this design of electronic thermometer is that the flexible end portion 61 tends to break when curved during a measuring action. Further, because the casing 60 has a smooth outer surface, the electronic thermometer tends to slip from the user's hand.

Furthermore, conventional electronic thermometers commonly have a rigid key portion provided below the flexible press portion for switching on/off the switch when the flexible press portion depressed by the user. The arrangement of the rigid key portion greatly increases the manufacturing cost of the electronic thermometer.

SUMMARY OF THE INVENTION

The present invention has been accomplished under the circumstances in view. It is therefore the main object of the present invention to provide an electronic thermometer, which is durable in use. It is another object of the present invention to provide an electronic thermometer, which is inexpensive to manufacture. It is still another object of the present invention to provide an electronic thermometer, which does not slip when held by the user. According to one aspect of the present invention, the electronic thermometer comprises an electronic thermometer is constructed to include a casing, an electronic thermometer module mounted in the casing, a metal probe electrically connected to the electronic thermometer module for sensing the body temperature, a flexible covering is covered on the casing, the flexible covering having a tapered front portion protruded over the front side of the casing to a distance, and a hard stem connecting the metal probe to the distal end of the tapered front portion of the flexible covering. According to another aspect of the present invention, the flexible covering comprises a press portion for pressing by a finger to switch on/off the switch of the electronic thermometer module, and a bellows portion extended around the press portion for enabling the press portion to be easily deformed to switch on/off the switch. According to still another aspect of the present invention, the flexible covering has embossed portions symmetrically provided at two opposite lateral sides thereof for the holding of the hand.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
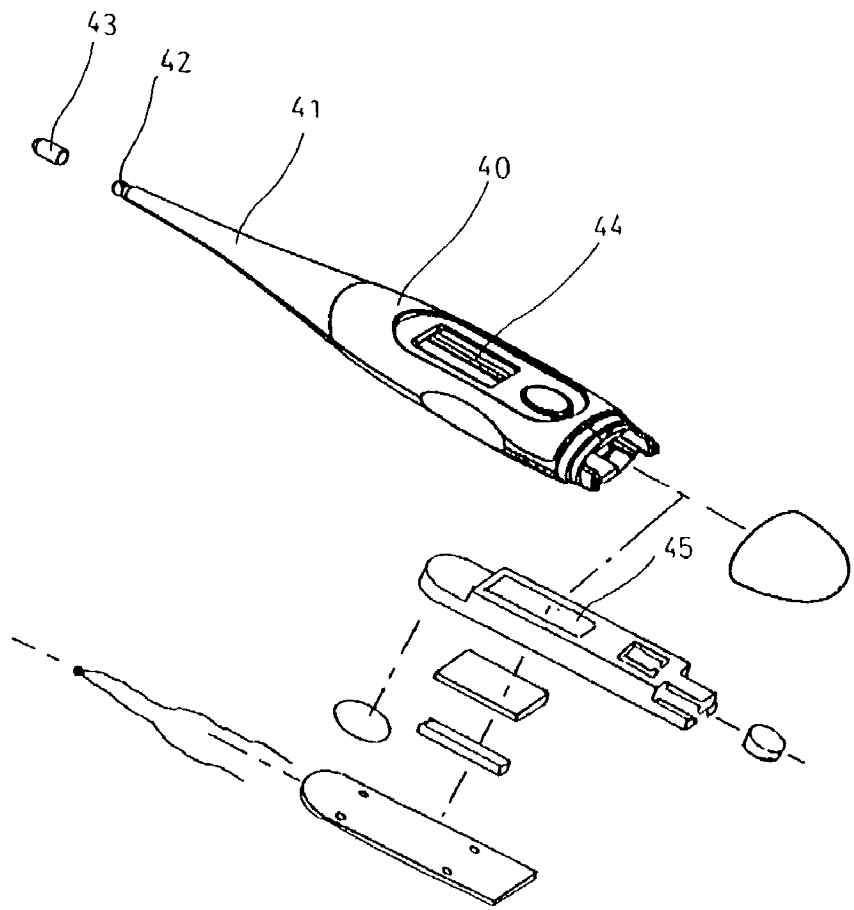
FIG. 1 is an exploded view of an exploded view of a flexible electronic thermometer according to Taiwan Patent Publication No. 495024.
Figure 2:
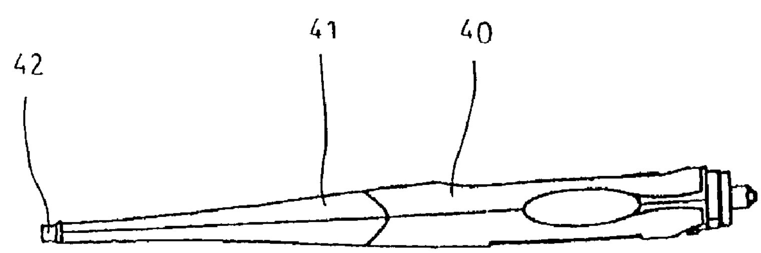
FIG. 2 is a side view of the flexible electronic thermometer shown in FIG. 1.
Figure 3:
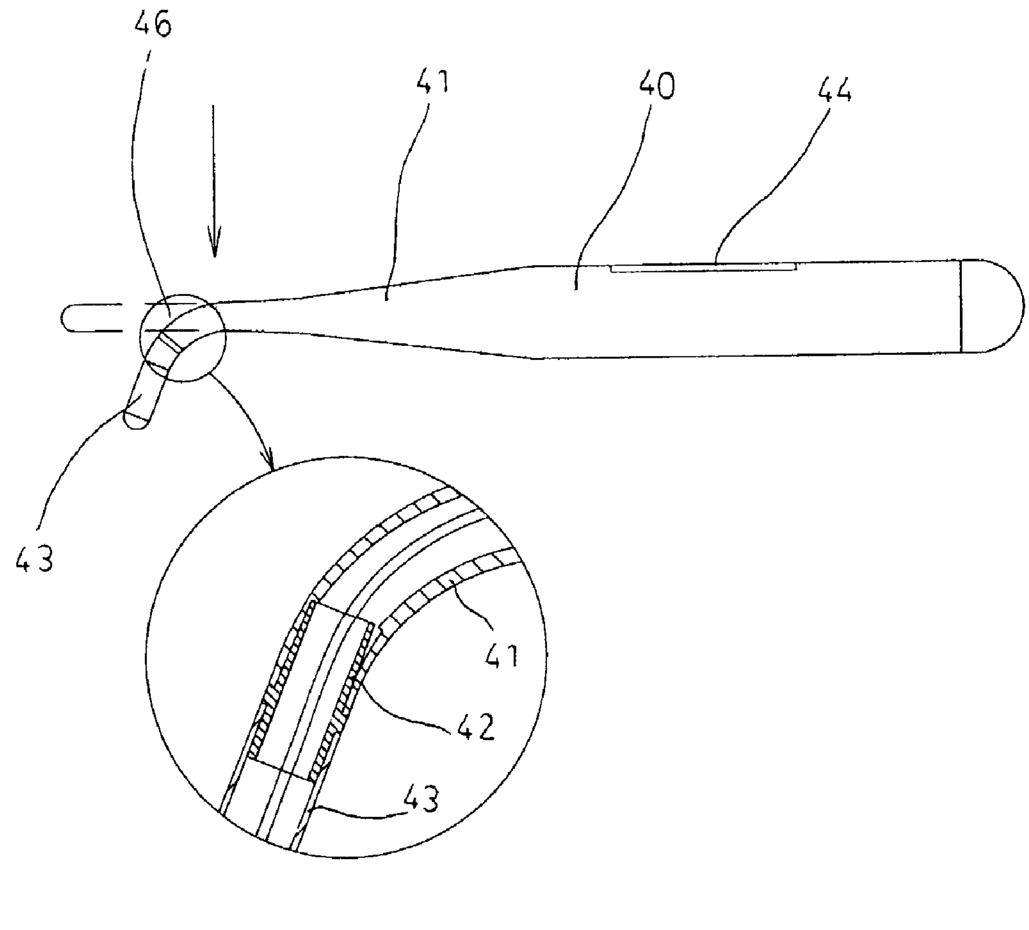
FIG. 3 is a schematic drawing showing the front end of the flexible electronic thermometer of FIG. 1 curved during a measuring action.
Figure 4:
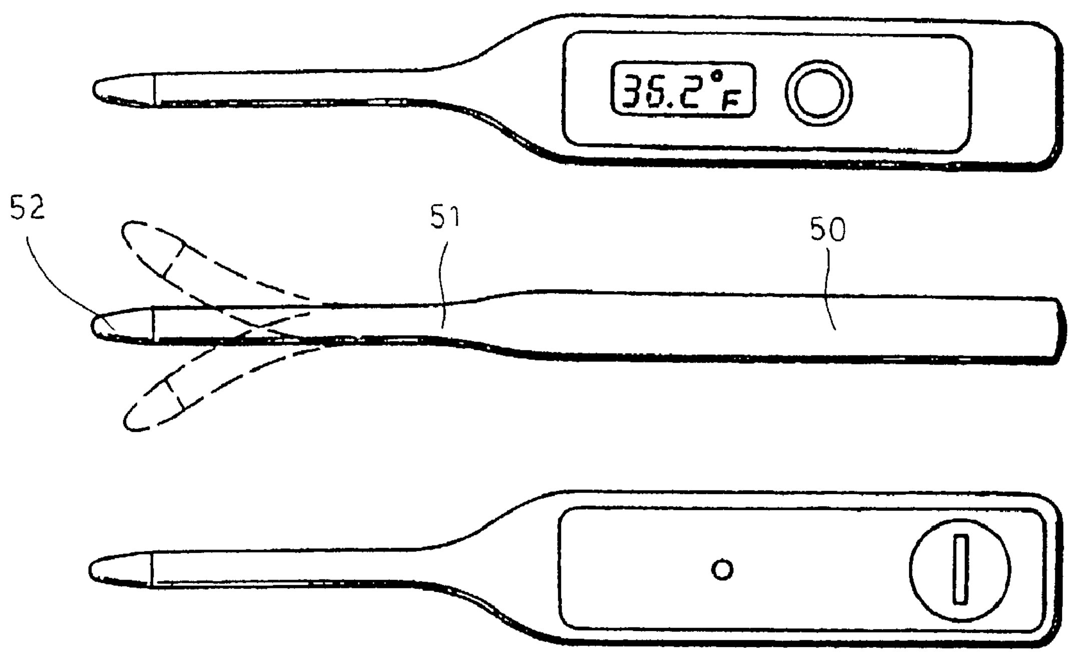
FIG. 4 is a schematic drawing showing the soft flexible casing of the electronic clinical thermometer curved according to U.S. Pat. No. 5,165,798.
Figure 5:
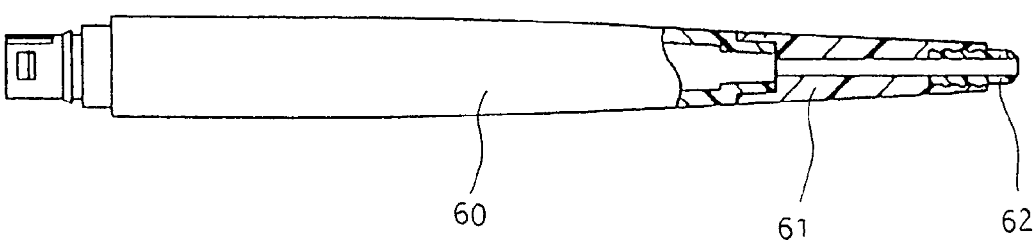
FIG. 5 is a schematic sectional view of the cost-effective electronic thermometer according to U.S. Pat. No. 6,379,039.
Figure 6:
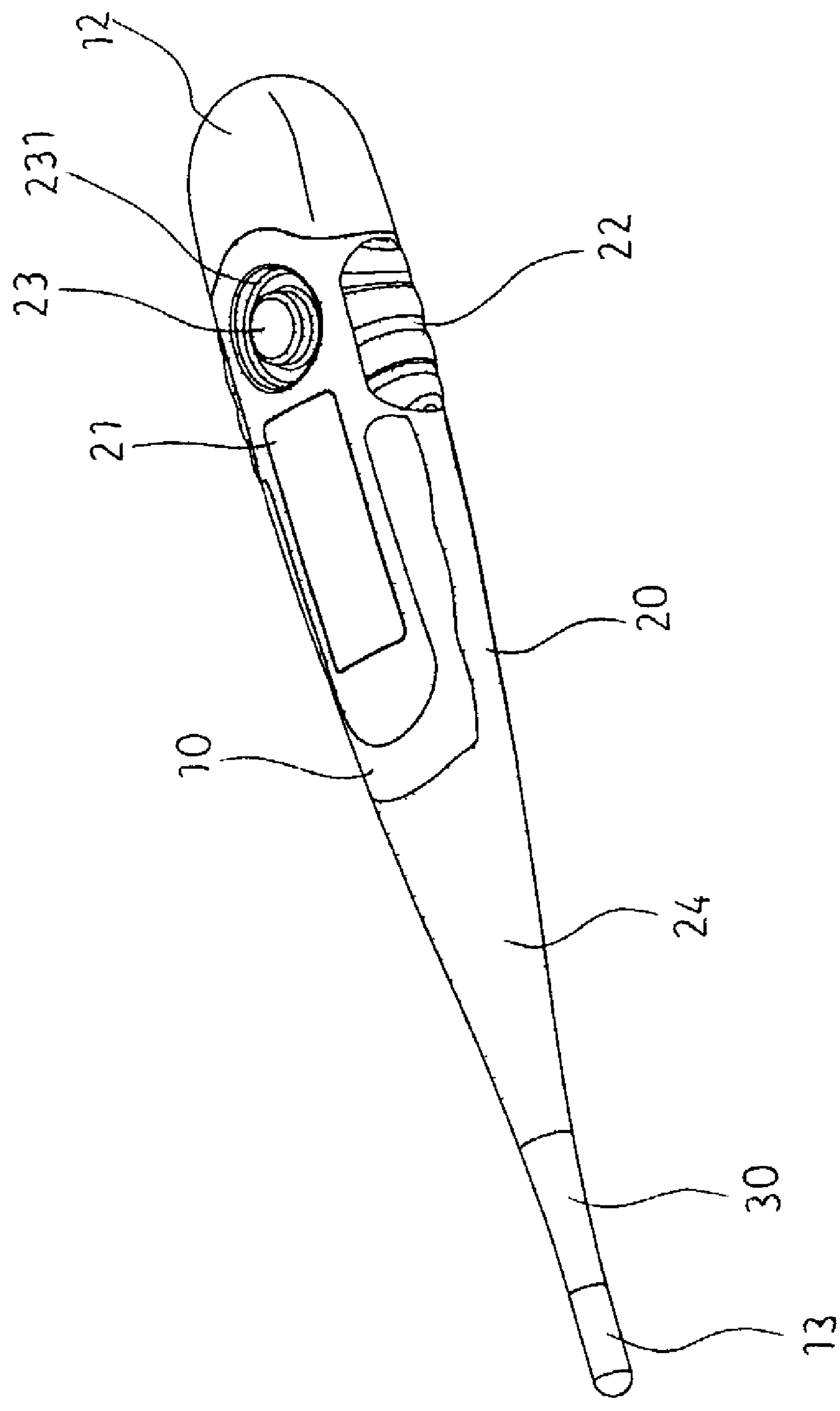
FIG. 6 is an elevational view of an electronic thermometer according to the present invention.
Figure 7:
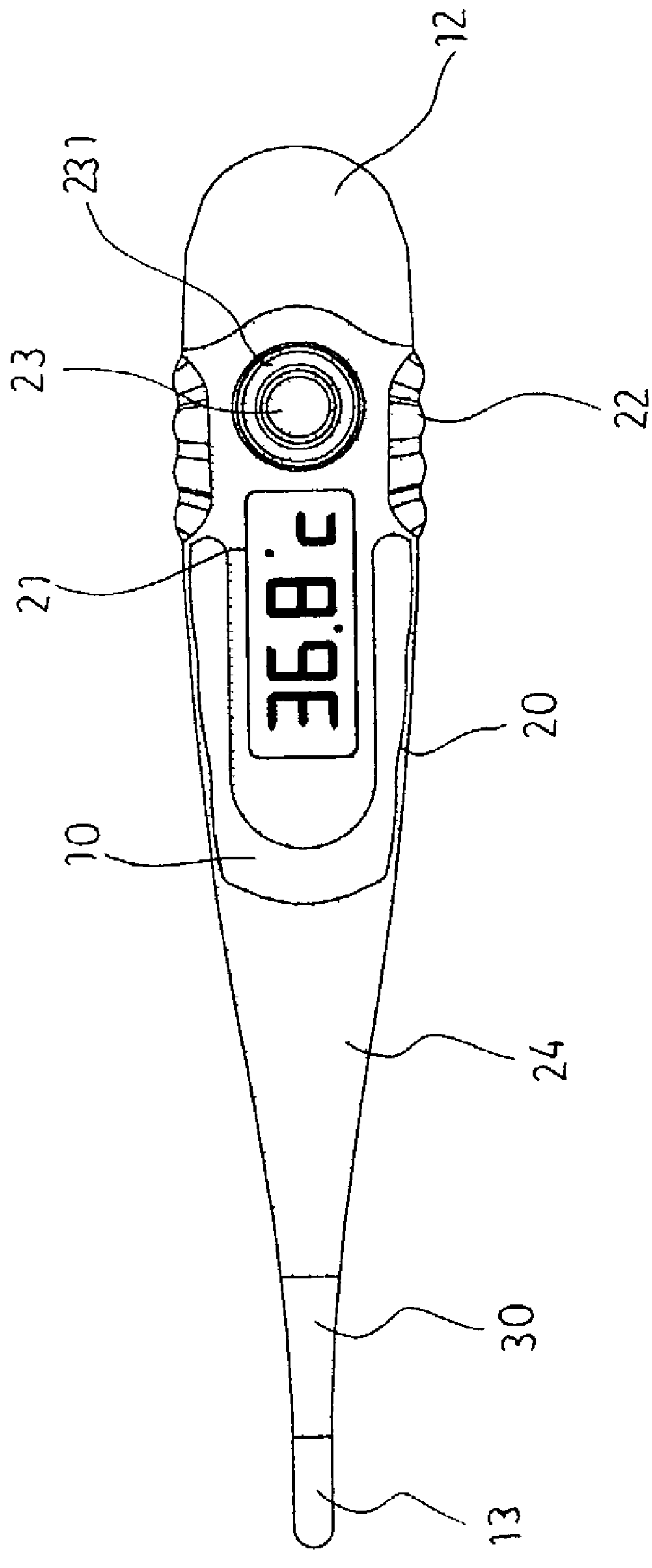
FIG. 7 is a top view of the electronic thermometer according to the present invention.
Figure 8:
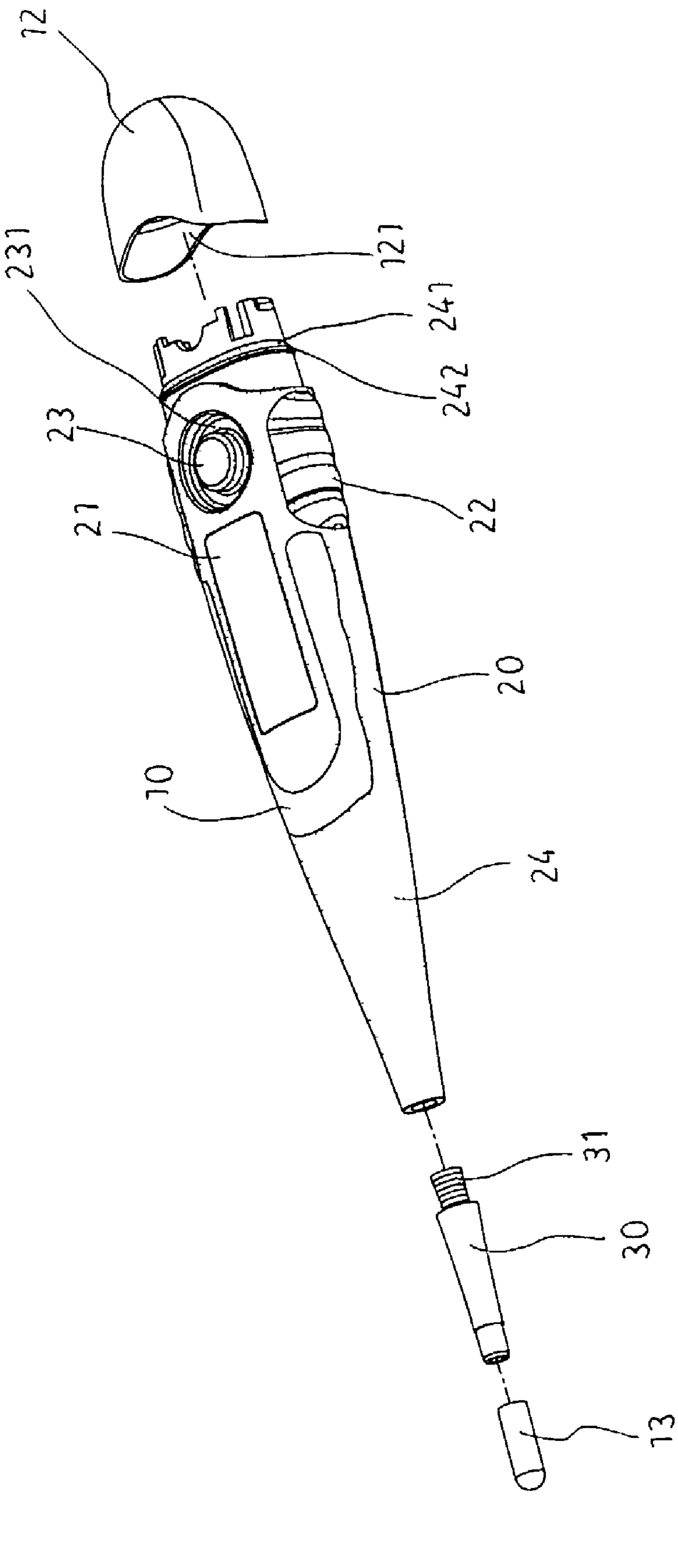
FIG. 8 is an exploded view of the electronic thermometer according to the present invention.
Figure 9:
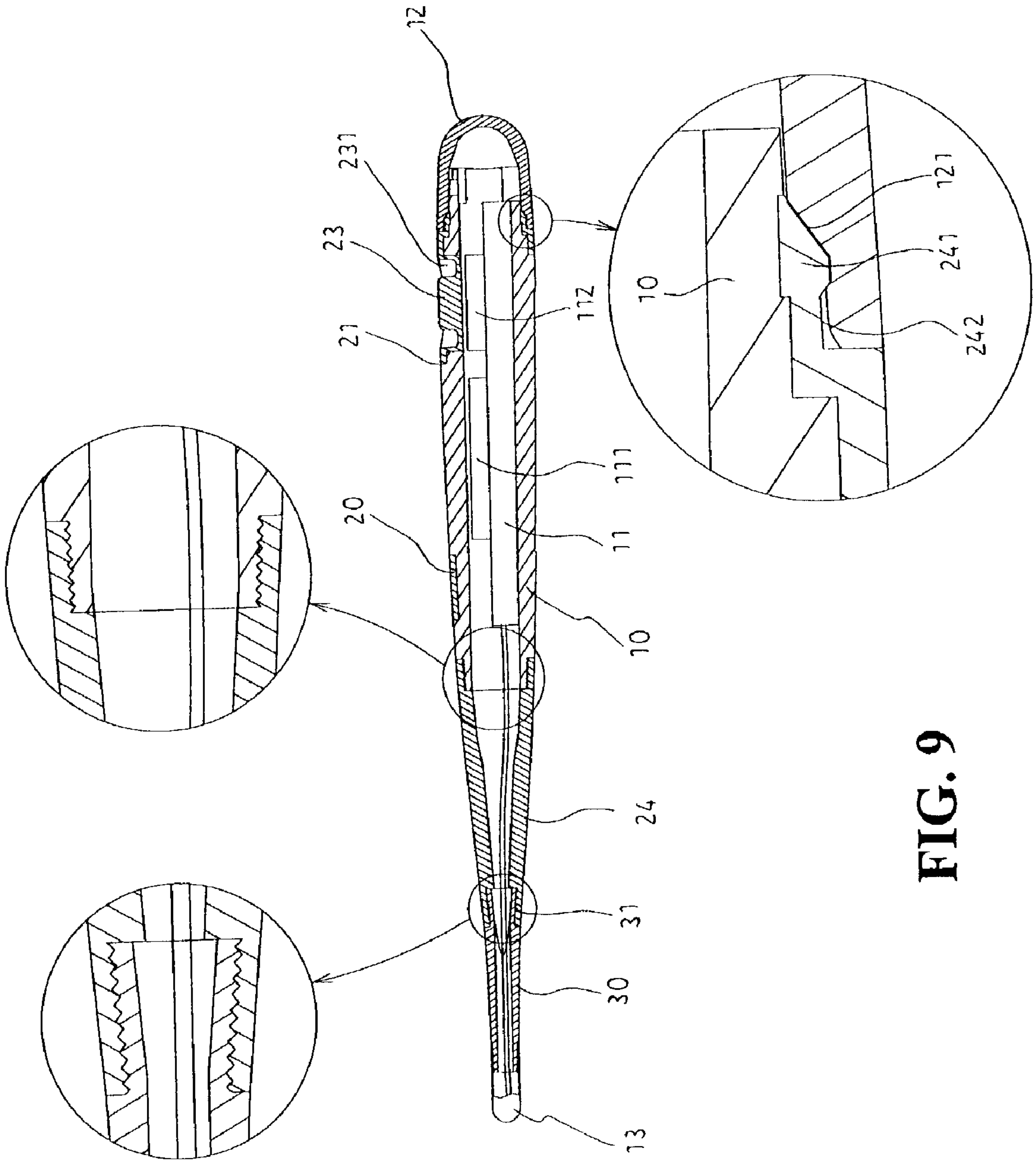
FIG. 9 is a sectional view of the electronic thermometer according to the present invention.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 6~9, an electronic thermometer in accordance with the present invention is shown comprising a casing 10, a circuit board 11 provided inside the housing 10, a cap 12 provided at the rear side of the casing 10, and a metal probe 13 provided at the front side of the casing 10.

The casing 10 is formed from transparent material and covered with a flexible (for example, rubber) covering 20. The flexible covering 20 extends to the rear side of the casing 10. The casing 10 has a locating flange 241 extended around the periphery near the rear side, and a locating groove 242 extended around the periphery adjacent to the locating flange 241. The cap 12 has an inside engagement portion 121 fitting the locating flange 241 and locating groove 242 of the casing 10. When the cap 12 capped on the rear side of the casing 10, the engagement portion 121 is forced over the locating flange 241 into watertight engagement with the locating groove 242 of the casing 10. The flexible covering 20 has an opening 21 for viewing the crystal liquid display 11 of the circuit board 11, two embossed portions 22 symmetrically provided at two sides for the resting of the fingers to hold the electronic thermometer, a press portion 23 for the pressing of the finger to switch on/off the switch 112 of the circuit board 1, and bellows portions 231 extended around the press portion 23 for enabling the press portion 23 to be easily deformed to switch on/off the switch 112 of the circuit board 1 precisely when pressed by the finger. The front portion 24 of the covering 20 is tapered and protruded over the front side of the casing 10 to a distance. A hard stem 30 formed from, for example, hard plastics is connected between the tapered front portion 24 of the covering 20 of the casing 10 and the metal probe 13. The hard stem 30 has a threaded neck 31 extended from the rear side and threaded into the distal end of the tapered front portion 24 of the covering 20 of the casing 10.

Figure 10:
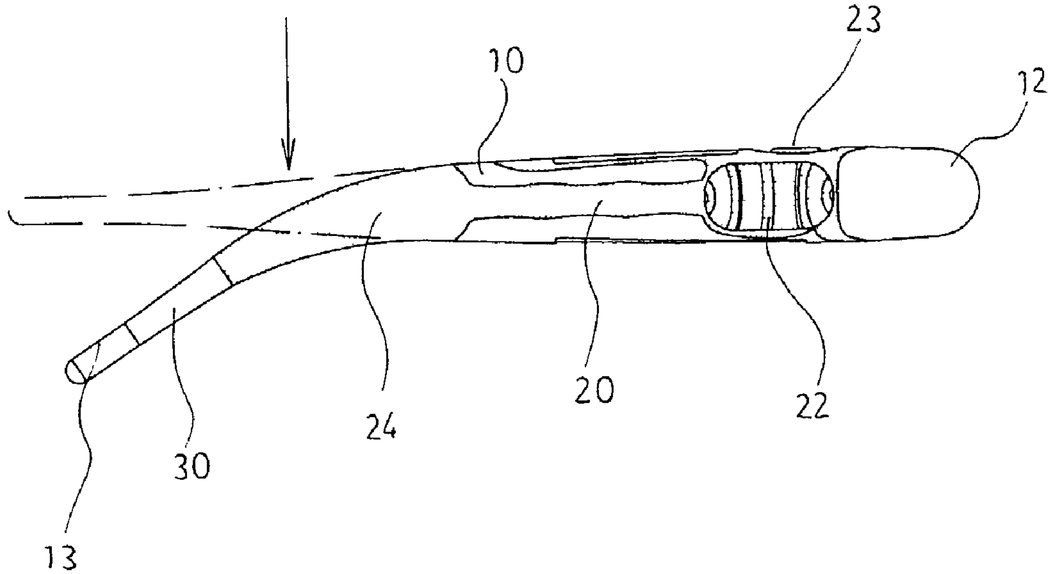
FIG. 10 is a schematic drawing showing the tapered front portion of the electronic thermometer curved during a measuring action.

Referring to FIG. 10, because the hard stem 30 has a certain length, the stress is concentrated on the root (the biggest diameter portion) of the covering 20 when the tapered front portion 24 of the covering 20 curbed during a measuring action. Therefore, the tapered front portion 24 does not break easily when curved by an external force. Further, because the hard stem 30 has a smooth surface, dust does not easily adhere to the hard stem 30, and the user can easily remove dirt from the hard stem 30.

A prototype of electronic thermometer has been constructed with the features of FIGS. 6~10. The electronic thermometer functions smoothly to provide all of the features discussed earlier.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed is:

1. An electronic thermometer comprising a casing, an electronic thermometer module mounted in said casing, and a metal probe electrically connected to said electronic thermometer module and disposed outside said casing for sensing body temperature, wherein a flexible covering is covered on said casing, said flexible covering having a tapered front portion protruded over a front side of said casing to a distance; a stem is connected between a smallest diameter end of said tapered front portion of said flexible covering and one end of said metal probe wherein said stem has a hard outside wall, which is not a part of the flexible covering.

2. The electronic thermometer as claimed in claim 1, wherein said casing is formed from transparent material; said flexible covering has an opening for viewing a liquid crystal display of said electronic thermometer module.

3. The electronic thermometer as claimed in claim 1, wherein said flexible covering comprises a press portion for pressing by a finger to switch on/off switch means of said electronic thermometer module, and a bellows portion extended around said press portion.

4. The electronic thermometer as claimed in claim 1, wherein said flexible covering has embossed portions symmetrically provided at two opposite lateral sides thereof for the holding of the hand.

5. The electronic thermometer as claimed in claim 1, wherein said stem has a threaded neck extended from one end thereof and threaded into said tapered front portion of said flexible covering.

6. The electronic thermometer as claimed in claim 1, wherein said casing has a rear side remote from the tapered front portion of said flexible covering, and a cap capped on said rear side, said rear side having a locating flange extended around the periphery thereof and a locating groove extended around the periphery adjacent to said locating flange, said cap having an inside engagement portion fitting over said locating flange and forced into engagement with said locating groove.

* * * * *